United States Patent [19]

Scholl et al.

[11] Patent Number: 4,960,848
[45] Date of Patent: Oct. 2, 1990

[54] PROCESS FOR THE PRODUCTION OF POLYISOCYANATES CONTAINING ISOCYANURATE GROUPS AND THEIR USE

[75] Inventors: Hans J. Scholl; Josef Pedain, both of Cologne, Fed. Rep. of Germany

[73] Assignee: Bayer Aktiengesellschaft, Leverkusen, Fed. Rep. of Germany

[21] Appl. No.: 341,348

[22] Filed: Apr. 21, 1989

[30] Foreign Application Priority Data

Apr. 27, 1988 [DE] Fed. Rep. of Germany ....... 3814167

[51] Int. Cl.$^5$ .............................................. C08G 18/16
[52] U.S. Cl. .......................................... 528/48; 528/45; 528/52; 528/59; 528/65; 502/164
[58] Field of Search ............... 528/45, 48, 59, 52, 528/65; 502/164

[56] References Cited

U.S. PATENT DOCUMENTS

| | | | |
|---|---|---|---|
| 3,487,080 | 12/1989 | Matsui et al. | 544/193 |
| 4,098,774 | 7/1978 | Bacsksai | 502/164 |
| 4,157,312 | 6/1979 | Frame | 502/164 |
| 4,310,634 | 1/1982 | McEntire et al. | 528/52 |
| 4,324,879 | 4/1982 | Bock et al. | 528/45 |
| 4,379,905 | 4/1983 | Stemmler et al. | 528/73 |
| 4,412,073 | 10/1983 | Robin | 544/193 |
| 4,419,513 | 12/1983 | Breidenbach et al. | 544/222 |
| 4,487,928 | 12/1984 | Richter et al. | 544/193 |
| 4,499,253 | 2/1985 | Kerimis et al. | 528/45 |
| 4,537,961 | 8/1985 | Robin | 544/193 |
| 4,582,888 | 4/1986 | Kase et al. | 528/49 |
| 4,595,534 | 6/1986 | Scholl | 540/202 |
| 4,604,418 | 8/1986 | Shindo et al. | 524/296 |
| 4,675,401 | 6/1987 | Robin | 544/193 |

FOREIGN PATENT DOCUMENTS 3240613 5/1984 Fed. Rep. of Germany .
920080 3/1963 United Kingdom .

OTHER PUBLICATIONS

J. H. Saunders, K. C. Frisch, Polyurethanes Chemistry and Technology, pp. 94 et seq., 1962, Part I.

Primary Examiner—John Kight, III
Assistant Examiner—Anang Sridharan
Attorney, Agent, or Firm—Joseph C. Gil; Thomas W. Roy

[57] ABSTRACT

The present invention is directed to a process for the production of isocyanurate polyisocyanates containing aliphatically and/or cycloaliphatically bound isocyanate groups by trimerizing a portion of the isocyanate groups of organic diisocyanates containing aliphatically and/or cycloaliphatically bound isocyanate groups in the presence of a trimerization catalyst and terminating the trimerization reaction at the desired degree of trimerization by the addition of a catalyst poison, characterized in the quaternary ammonium fluorides are used as the catalyst.

The present invention is also directed to the use of these isocyanurate polyisocyanates for the production of polyurethane lacquers.

11 Claims, No Drawings

PROCESS FOR THE PRODUCTION OF POLYISOCYANATES CONTAINING ISOCYANURATE GROUPS AND THEIR USE

BACKGROUND OF THE INVENTION

1. Field of the Invention

This invention relates to a new process for the production of polyisocyanates containing isocyanurate groups and to the use of the products obtained by this process, optionally in blocked form, as the isocyanate component in polyurethane lacquers.

2. Description of the Prior Art

There are several known processes for the trimerization of organic isocyanates (J. H. Saunders and K. C. Frisch, Polyurethanes Chemistry and Technology, pages 94 et seq. (1962)). Suitable trimerization catalysts are strong organic bases such as the alkaline metal salts of carboxylic acids, metal alcoholates, metal phenolates, alkali metal carbonates, tertiary amines, tertiary phosphines and the "onium" compounds of nitrogen and phosphorus and also basic heterocycles of these elements.

The use of quaternary ammonium hydroxides as catalysts for the trimerization of isocyanate groups has been repeatedly described. According to JP-P No. 601,337 (U.S. Pat. No. 3,487,080), quaternary ammonium hydroxides are used together with certain co-catalysts; the examples primarily describe the partial trimerization of aromatic diisocyanates, although non-aromatic diisocyanates are also exemplified.

The process according to EP-A-No. 10,589 is a further development of the process according to the above-mentioned Japanese patent. According to this prior publication, hydroxyalkyl-substituted quaternary ammonium hydroxides are used as catalysts for the trimerization of HDI. Using these catalysts, HDI can be trimerized without cloudiness. The disadvantage of this process is that the hydroxyalkyl ammonium hydroxides are very difficult to produce in colorless form and have to be used in relatively large quantities of up to 0.6%. Accordingly, the products obtained by the process, i.e. the isocyanurate polyisocyanates freed from excess starting diisocyanate, may possess a yellowish color.

EP-A-No. 47,452 describes the production of mixed trimers based on HDI and IPDI using comparatively large quantities of catalysts as can be seen from the examples.

Other known processes for the production of isocyanurate polyisocyanates based on HDI are also attended by serious disadvantages. GP-P No. 920,080, DE-OS Nos. 3,100,262, 3,219,608 or 3,240,613 describe processes for the trimerization of HDI using metal-containing catalysts and co-catalysts, such as phenols, alcohols or tertiary amines. The metal compounds can only be removed from the end products by very expensive processes, if at all, and can affect subsequent applications and also the stability of the end products. In addition, the use of co-catalysts containing active hydrogen atoms leads to secondary reactions consuming valuable isocyanate groups. The same also applies to the process according to EP-A-No. 155,559, in which ammonium salts of organic acids are used as catalysts together with large amounts of alcoholic compounds.

In the processes according to EP-A-Nos. 57,653, 89,297 and 187,105, organosilicon catalysts are used in comparatively large quantities. These compounds also cannot be completely removed from the end product and affect its use.

Accordingly, an object of the present invention is to provide a new process for the partial trimerization of the isocyanate groups of organic diisocyanates containing aliphatically and/or cycloaliphatically bound isocyanate groups which combines the following advantages:

The end products of the process are substantially colorless, i.e. have a color value (HAZEN) according to DIN 53,409 of less than 100.

The end products of the process are free from cloudiness and can be dissolved without cloudiness in standard lacquer solvents.

The end products of the process do not contain any metal ions.

The process can be carried out using minimal quantities of catalysts without the need for large quantities of co-catalysts which consume isocyanate groups.

It has now surprisingly been found that this object can be achieved by the process described in detail in the following.

SUMMARY OF THE INVENTION

The present invention is directed to a process for the production of isocyanurate polyisocyanates containing aliphatically and/or cycloaliphatically bound isocyanate groups by trimerizing a portion of the isocyanate groups of organic diisocyanates containing aliphatically and/or cycloaliphatically bound isocyanate groups in the presence of a trimerization catalyst and terminating the trimerization reaction at the desired degree of trimerization by the addition of a catalyst poison, characterized in the quaternary ammonium fluorides are used as the catalyst.

The present invention is also directed to the use of these isocyanurate polyisocyanates for the production of polyurethane lacquers.

DETAILED DESCRIPTION OF THE INVENTION

The use of quaternary ammonium fluorides as trimerization catalysts is critical to the present invention. Any quaternary ammonium fluoride may be used. The substituents at the nitrogen atom include alkyl groups, alkyl-aralkyl groups or mixtures thereof. Quaternary ammonium fluorides based on heterocyclic amines are also suitable.

Preferred catalysts include compounds corresponding to the formula

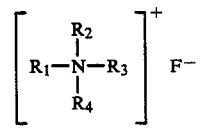

wherein $R_1$, $R_2$, $R_3$ and $R_4$ may be the same or different and represent $C_1$-$C_{18}$, preferably $C_2$-$C_8$ alkyl radicals or wherein $R_1$, $R_2$ and $R_3$ may be the same or different and represent $C_1$-$C_{18}$, preferably $C_1$-$C_4$ alkyl radicals, more preferably methyl groups, and $R_4$ is a benzyl radical.

Examples of catalysts include tetramethyl ammonium fluoride, tetraethyl ammonium fluoride, tetra-n-propyl ammonium fluoride, tetra-n-butyl ammonium fluoride, N,N,N-trimethyl-N-cyclohexyl ammonium fluoride, N,N,N-trimethyl-N-benzyl ammonium fluoride, N,N,N-trimethyl-N-phenyl ammonium fluoride, N,N,N-trimethyl-N-stearyl ammonium fluoride, N,N'-dimethyl triethylenediamine difluoride or N-methyl triethylenediamine monofluoride. Mixtures of the catalysts mentioned by way of example may also be used.

N,N,N,N-tetra-n-butyl ammonium fluoride and N,N,N-trimethyl-N-benzyl ammonium fluoride are particularly preferred. The catalyst is preferably added to the starting diisocyanates to be trimerized in the form of about 0.1 to 2% by weight solutions in suitable solvents such as 2-ethylhexane-1,3-diol, acetonitrile or dimethylformamide.

The catalysts may optionally be adsorbed onto suitable support materials, such as silica gel, in which case they may be removed after deactivation by filtration.

The quantity of catalyst used in the process according to the invention, based on the diisocyanate used, is less than 0.1% by weight. The catalysts are preferably used in a quantity of 0.001 to 0.02% by weight, based on the diisocyanate used.

The process according to the invention is suitable for the partial trimerization of organic diisocyanates containing aliphatically and/or cycloaliphatically bound isocyanate groups. Suitable starting diisocyanates for the process according to the invention include, in particular, aliphatic or cycloaliphatic diisocyanates having a molecular weight above 139, preferably in the range 140 to 250. Examples include tetramethylene diisocyanate, hexamethylene diisocyanate (HDI), dodecyl methylene diisocyanate, cyclobutane-1,3-diisocyanate, cyclohexane-1,3- and -1,4-diisocyanate, 1-isocyanato-3,3,5-trimethyl-5-isocyanatomethyl cyclohexane (IPDI), perhydro-2,4- and/or -2,6-diisocyantotoluene, perhydro-2,4'- and/or -4,4'-diisocyanatodiphenylmethane or mixtures of these diisocyanates. 1,6-diisocyanatohexane (HDI) is particularly preferred as the starting diisocyanate.

Apart from any solvent present in the catalyst, the process according to the invention, which preferably takes place in an inert gas atmosphere (for example nitrogen), is preferably carried out in the absence of solvents at a temperature of about 0° to 100° C., preferably about 20° to 80° C. However, the process may also be carried out in the presence of inert solvents, for example hydrocarbons (such as toluene or xylene) or esters (such as butyl acetate).

The trimerization reaction is preferably carried out within the temperature ranges mentioned to a degree of trimerization of about 10 to 40%, preferably about 20 to 30%. By "degree of trimerization" is meant the percentage of isocyanate groups in the starting diisocyanate which are converted into isocyanurate groups. The degree of trimerization may be monitored during the trimerization reaction, for example by continuous determination of the refractive index or the NCO content of the reaction mixture.

To terminate the trimerization reaction, a suitable catalyst poison is generally added to the reaction mixture. Suitable catalyst poisons are compounds which enter into chemical reactions with quaternary ammonium fluorides (for example, calcium chloride or alkyl chlorosilanes such as ethyl chlorosilane) or substances which adsorptively bind quaternary ammonium fluorides (such as silica gel). Suitable catalyst poisons also include organic acids or acid chlorides which deactivate the catalysts according to the invention, for example, sulfonic acids (such as benzene or toluenesulfonic acid or chlorides thereof) or acidic esters of phosphorus acid or phosphoric acid (such as dibutylphosphite, dibutylphosphate or di-(2-ethylhexyl)-phosphate). The deactivators mentioned by way of example, which react chemically with the catalysts and deactivate them, are generally added to the reaction mixture in a quantity at least equivalent to the catalyst. However, since the catalysts are partially deactivated during the trimerization reaction, the addition of a subequivalent quantity of the deactivator is often sufficient. The catalyst poisons which react chemically with the catalysts to deactivate them are preferred to the adsorbing substances because the adsorbing substances generally have to be subsequently removed, for example, by filtration.

After deactivation, excess diisocyanate, particularly in the preferred solvent-free embodiment of the process, is preferably removed by a suitable method, for example, extraction (for example using n-hexane as extractant) or, preferably, thin-layer distillation under vacuum, to a residual content of at most 2.0% by weight, preferably at most 0.5% by weight and more preferably less than 0.2% by weight of unreacted starting diisocyanate.

The preferred HDI-based end products of the process according to the invention are colorless liquids having a color value (HAZEN) according to DIN 53,409 of less than 100, preferably less than 50, an isocyanate content of about from 10 to 24% by weight and a viscosity at 23° C. of about 500 to 10,000 mPa.s.

Since only very small quantities of catalyst are used in the process according to the invention, the quantity of deactivator, i.e. catalyst poison, can be kept correspondingly small. This results in end products of the process according to the invention containing only very small quantities of secondary products (formed from catalyst and catalyst poison) which remain dissolved and do not affect the subsequent use of the end products. Clear and colorless end products are obtained even when technical HDI is used, i.e. HDI which has not be subjected to purification by known methods, for example, distillation through weakly basic compounds such as metal oxides or sodium hydrogen carbonate to remove traces of chlorine-containing compounds. By virtue of their low viscosity, the end products of the process are particularly suitable for the production of solvent-free or low-solvent two-component polyurethane lacquers.

When the end products of the process according to the invention are used in accordance with the invention, they may be blocked with blocking agents for isocyanate groups. Suitable blocking agents include the compounds disclosed in EP-A-No. 10,589, page 15, lines 14–26 (U.S. Pat. No. 4,324,879, herein incorporated by reference).

The end products of the process according to the invention are preferably used in combination with known compounds containing at least two hydroxyl groups such as polyhydroxyl polyesters, polyhydroxyl polyethers and, in particular, polyhydroxyl polyacrylates for the production of high-quality two-component polyurethane lacquers. The coating compositions may also contain low molecular weight, preferably aliphatic polyols. In particular, compositions based on the end products of the process according to the invention and polyhydroxyl polyacrylates are valuable two-component binders for high-quality, highly weather-resistant automotive repair lacquers.

Polyamines, particularly in blocked form as polyketimines or oxazolidines, are also suitable reactants for the end products of the process according to the invention.

The quantitative ratios in which the optionally blocked polyisocyanates according to the invention and the reactants mentioned are reacted in the production of polyurethane lacquers are generally selected such that there are 0.8 to 3, preferably 0.9 to 1.8 hydroxyl, amino and/or carboxyl groups for every (optionally blocked) isocyanate group. The hardening process may be accelerated in known manner by the catalysts commonly used in isocyanate chemistry, for example, tertiary amines such as triethylamine, pyridine, methylpyridine, benzyldimethylamine, N,N-dimethylaminocyclohexane, N-methylpiperidine, pentamethyl diethylenetriamine, N,N'-endoethylene piperazine and N,N'-dimethylpiperazine; and metal salts such as iron(III) chloride, zinc chloride, zinc-2-ethylcaproate, tin(II)-2-ethylcaproate, dibutyltin(IV) dilaurate and molybdenum glycolate.

In blocked form, the end products of the process according to the invention, in combination with polyhydroxyl compounds of the type mentioned, are preferably used for the production of stoving lacquers which may be hardened at temperatures of about 80° to 180° C., depending upon the blocking agent used, to form high-quality lacquer coatings.

The two-component lacquers may also contain known additives such as pigments, dyes, fillers and levelling agents. To prepare the lacquers the ingredients are thoroughly mixed with one another and homogenized in a standard mixing unit, for example a sand mill, in the presence or absence of solvents and diluents.

The paints and coating compositions may be applied to the object to be coated in solution, from a melt or in solid form by standard methods, for example, by spread coating, roll coating, casting, spray coating, fluidized bed coating or electrostatic powder spraying.

The lacquers containing the polyisocyanates according to the invention provide films which adhere surprisingly well to metallic substrates and show particular light stability, color stability under heat and high abrasion resistance. They are also distinguished by extreme hardness, elasticity, very high resistance to chemicals, high gloss, excellent weather resistance and good pigmentability.

In the following examples, all percentages are percentages by weight.

Catalyst compositions

Catalyst solution A:
0.5% by weight N,N,N-trimethyl-N-benzyl ammonium fluoride (Fluka GmbH) in 2-ethylhexane-1,3-diol.

Catalyst solution B:
1% by weight N,N,N-trimethyl-N-benzyl ammonium fluoride in 2-ethylhexane-1,3-diol.

Catalyst C:
Tetra-n-butyl ammonium fluoride on silica gel, ~1.1 mmole F⁻/g resin (Fluka GmbH).

Catalyst solution D:
1% by weight tetra-n-butyl ammonium fluoride in acetonitrile.

EXAMPLES

Example 1

1680 g (10 mole) HDI were heated under nitrogen to 40° C. 12 g catalyst solution A were then added dropwise over a period of 60 minutes; the progress of the reaction was followed by measurement of the increasing refractive index. After 24 hours at 40° C., during which further quantities of catalyst solution A (max. 3 g) were added in portions, a refractive index $n_D^{23°\ C.}$ of 1.4672 was reached which corresponds to an NCO content value of 41.5%. The reaction was terminated by the addition of 0.1 g dibutylphosphate. Excess HDI was then separated by thin-layer distillation ("short-path evaporator") at 120° C./0.1 mbar to a residual content of 0.1%. 534 g of a clear, colorless polyisocyanate having the following data were obtained:
NCO content: 22.6%.
Viscosity: 3000 mPa.s/23° C.
Color value (HAZEN) according to DIN 53,409:10.

Example 2

1680 g (10 mole) HDI were reacted as in Example 1 with 8 g catalyst solution B and then in portions with another 2 g catalyst solution B until a refractive index $n_D^{23°\ C.}$ of 1.4708 was reached which corresponds to an NCO content of 39.7%. After termination and working up as in Example 1, 633 g of a clear, colorless polyisocyanate having the following data were obtained:
NCO content: 22.2%.
Viscosity: 4300 mPa.s/23° C.
Color value (HAZEN) according to DIN 53,409:20.

Example 3

A mixture of 336 g (2 mole) HDI and 111 g (0.5 mole) IPDI (isophorone diisocyanate) was heated under nitrogen to 40° C., followed by the addition of 4 g catalyst solution A over a period of 60 minutes. After 22 hours at 40° C., during which another 1 g catalyst solution A was added in portions, a refractive index $n_D^{23°\ C.}$ of 1.4721 was reached which corresponds to an NCO content of 40.1%. After termination and working up as in Example 1 (thin-layer distillation at 140° C./0.1 mbar), 121 g of a colorless, clear polyisocyanate having the following data were obtained:
NCO content: 21%.
Viscosity: 5400 mPa.s/23° C.
Color Value (HAZEN) according to DIN 53,409:20.

A molar ratio of HDI to IPDI of 8:1 was calculated for the polyisocyanate from GC analysis of the thin-layered distillate.

Example 4

1.3 g catalyst C were added under nitrogen at 30° C. to 1680 g (10 mole) HDI, followed by stirring at 30° C. until a refractive index $n_D^{23°\ C.}$ of 1.4634 was reached which corresponds to an NCO content of 43.2% (approx. 20 hours). The reaction was terminated by the addition of 20 g calcium chloride. The reaction mixture was stirred for 1 hour and the calcium chloride and catalyst was separated by filtration. After working up as in Example 1, 396 g of a clear, colorless polyisocyanate having the following data were obtained:
NCO content: 23.1%.
Viscosity: 2000 mPa.s/23° C.
Color value (HAZEN) according to DIN 53,409:30.

Example 5

7 g catalyst solution D were added over a period of 10 minutes under nitrogen at 30° C. to 336 g (2 mole) HDI. After approximately 24 hours at 30° C., a refractive index $n_D^{23°\ C.}$ of 1.4785 was reached which corresponds to an NCO content of 32.1%. The reaction was terminated by the addition of 0.1 g trimethyl chlorosilane. After working up in accordance with Example 1, 190 g of a clear, colorless polyisocyanate having the following data were obtained:

NCO content: 20.6%.
Viscosity: 9400 mPa.s/23° C.
Color value (HAZEN) according to DIN 53,409:20.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of an isocyanurate polyisocyanate containing aliphatically and/or cycloaliphatically bound isocyanate groups which comprises trimerizing a portion of the isocyanate groups of an organic diisocyanate containing aliphatically and/or cycloaliphatically bound isocyanate groups in the presence of a quaternary ammonium fluoride catalyst and terminating the trimerization reaction at the desired degree of trimerization by the addition of a catalyst poison.

2. The process of claim 1 which comprises removing unreacted starting diisocyanates by thin-layer distillation after termination of the trimerization reaction.

3. The process of claim 1 wherein said catalyst comprises N,N,N-trimethyl-N-benzyl ammonium fluoride.

4. The process of claim 2 wherein said catalyst comprises N,N,N-trimethyl-N-benzyl ammonium fluoride.

5. The process of claim 1 wherein said catalyst comprises tetra-n-butyl ammonium fluoride.

6. The process of claim 2 wherein said catalyst comprises tetra-n-butyl ammonium fluoride.

7. A process for the production of an isocyanurate polyisocyanate which comprises trimerizing a portion of the isocyanate groups of 1,6-diisocyanatohexane in the presence of a quaternary ammonium fluoride catalyst, terminating the trimerization reaction at the desired degree of trimerization by the addition of catalyst poison and separating unreacted 1,6-diisocyantohexane by thin-layer distillation.

8. The process of claim 7 wherein said catalyst comprises N,N,N-trimethyl-N-benzyl ammonium fluoride.

9. The process of claim 7 wherein said catalyst comprises tetra-n-butyl ammonium fluoride.

10. A process for the production of a polyurethane coating which comprises
    (a) preparing an isocyanurate polyisocyanate in accordance with the process of claim 1 and
    (b) reacting said isocyanurate polyisocyanate with a compound containing at least two hydroxyl groups.

11. The process of claim 10 wherein said isocyanurate polyisocyanate is blocked with a blocking agent for isocyanate groups.

* * * * *